US006424066B1

(12) United States Patent
Watson et al.

(10) Patent No.: US 6,424,066 B1
(45) Date of Patent: Jul. 23, 2002

(54) SYSTEM FOR REDUCING WEAR AND IMPROVING LONGEVITY OF A ELECTRIC SUBMERGIBLE PUMPING SYSTEM

(75) Inventors: Arthur I. Watson; Thiam Hock Francis Tan; Heng Lye Chang; John Lee Yoon Kion, all of Singapore (SG)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/439,530

(22) Filed: Nov. 12, 1999

(51) Int. Cl.$^7$ ................................................. H02K 5/16
(52) U.S. Cl. ......................... 310/90; 384/215; 179/92; 310/87
(58) Field of Search .............................. 310/89, 87, 90; 384/215, 218, 222, 10, 219; 175/92, 93

(56) References Cited

U.S. PATENT DOCUMENTS

| | | | | |
|---|---|---|---|---|
| 3,551,714 A | * | 12/1970 | Boyd | 310/87 |
| 3,663,847 A | * | 5/1972 | Schaefer | 310/90 |
| 4,119,874 A | * | 10/1978 | Beavers et al. | 310/90 |
| 4,435,661 A | * | 3/1984 | Witten | 310/90 |
| 4,453,099 A | * | 6/1984 | Flat | 310/87 |
| 4,513,215 A | * | 4/1985 | Del Serra | 310/90 |
| 4,521,708 A | * | 6/1985 | Vandevier | 310/87 |
| 4,638,198 A | * | 1/1987 | Cochran | 310/87 |
| 4,790,683 A | * | 12/1988 | Cramer, Jr. et al. | 403/372 |
| 5,003,210 A | * | 3/1991 | Liu et al. | 310/87 |
| 5,189,328 A | * | 2/1993 | Knox | 310/90 |
| 5,230,787 A | * | 7/1993 | Cherian et al. | 205/67 |
| 5,463,811 A | * | 11/1995 | Aureli et al. | 29/898.046 |
| 5,559,383 A | * | 9/1996 | Ide | 310/90 |
| 5,659,214 A | * | 8/1997 | Guardiani et al. | 310/87 |
| 6,139,190 A | * | 10/2000 | Provence | 384/273 |

FOREIGN PATENT DOCUMENTS

GB 2 335 243 9/1999

* cited by examiner

*Primary Examiner*—Karl Tamai
(74) *Attorney, Agent, or Firm*—Fletcher, Yoder & Van Someren (57) ABSTRACT

An electric submergible pumping system having a submergible electric motor with a unique rotor bearing system to promote longevity of the motor. The system includes an electric motor having a housing and a stator mounted within the housing. A shaft is rotatably mounted within the housing for rotation within an interior, axial passage through the stator. A rotor bearing assembly is disposed intermediate the stator and the shaft. The assembly includes a bearing sleeve mounted adjacent the shaft, and a main body portion disposed in sliding engagement with the bearing sleeve. A spring mechanism, such as a wave spring, is engaged with the main body portion. A bracelet is located between the spring mechanism and an interior surface of the stator. The spring mechanism biases the bracelet against the stator to prevent the body portion from rotating during rotation of the shaft.

11 Claims, 7 Drawing Sheets

SYSTEM FOR REDUCING WEAR AND IMPROVING LONGEVITY OF A ELECTRIC SUBMERGIBLE PUMPING SYSTEM

FIELD OF THE INVENTION

The present invention relates generally to electric submergible pumping systems, and particularly to bearing systems for improving the wear characteristics of a submergible motor implemented in the electric submergible pumping system.

BACKGROUND OF THE INVENTION

Pumping systems, such as electric submergible pumping systems, are utilized in pumping petroleum and/or other production fluids from wells. A typical electric submergible pumping system includes components, such as a submergible motor, a motor protector and a submergible pump for producing fluids to the surface of the earth. Each of the submergible components has moving parts that are subject to wear. For example, one area subject to wear is within the stator, and specifically at a rotor bearing used to rotatably support an axial shaft within the submergible motor.

Typically, a submergible motor is designed with a shaft rotatably mounted in at least one support bearing disposed within an internal bore or opening through the stator. For example, bronze bearing sleeves have been used for rotation within a steel bearing. However, such combination is readily galled by dirt or boundary lubrication. This wear can lead to rubbing or scraping of the rotor against the stator, resulting in friction, wear, overheating, and eventual short circuit of the motor. Steel bearings, on the other hand, are slightly induction driven and subject to heating, even when bronze stator laminations are used at the bearing location.

In other applications, hard, non-magnetic (Stellite™) bearings have been used with all steel laminations, but the use and formation of such materials tends to be very expensive. Soft, non-magnetic bearings, however, tend to incur galling proximate the stator bore.

Another reason conventional bearings have been unsatisfactory is that the bearings tend to spin within the stator bore creating detrimental wear areas on the stator. The impetus for bearings to spin include electromagnetic induction, oil shear, thrust friction, and bushing friction. Attempts have been made to prevent the bearing from spinning within the stator bore, but those attempts have proved expensive, unreliable, damaging to the laminations and often difficult to assemble.

It would be advantageous to have a dependable, economical bearing system for use in submergible motors and electric submergible pumping systems that would prevent rotation of the bearing relative to the inner wall of the stator.

SUMMARY OF THE INVENTION

The present invention features an electric motor comprising a housing, a stator mounted within the housing, and a shaft rotatably mounted within the housing. The motor further comprises a rotor bearing disposed between the stator and the shaft. The rotor bearing includes a bearing sleeve mounted adjacent the shaft and a main body portion disposed in sliding engagement with the bearing sleeve. A spring mechanism is engaged with the main body portion, and a bracelet is disposed around the spring mechanism intermediate the spring and the stator. The spring biases the bracelet against an internal wall of the stator to limit rotation of the bearing with respect to the stator.

According to another aspect of the present invention, a rotor bearing is provided for use in an electric motor. The motor is of the type having a rotor mounted on a rotatable shaft within a center bore or opening of a stator. The rotor bearing includes a main body portion, a spring mechanism and a bracelet. The main body portion has a radially inward contact surface that slidingly engages a bearing sleeve mounted to the shaft. The spring mechanism is disposed about the main body portion, and the bracelet is pressed between the spring mechanism and the stator.

According to another aspect of the present invention, a submergible pumping system is provided for use in a wellbore. The pumping system includes a submergible pump, a submergible motor protector, and a submergible motor. The submergible motor includes a housing, a stator and a shaft rotatably mounted within the stator. The motor further includes a rotor bearing disposed between the stator and the shaft. The rotor bearing includes a bearing sleeve, a main body portion, a spring mechanism, and a bracelet. The bracelet is disposed about the spring mechanism between the spring mechanism and an interior surface of the stator. As the shaft rotates, the bearing sleeve slides against an interior surface of the main body portion, and the spring mechanism forces the bracelet to an expanded position against the interior surface of the stator to prevent rotation of the main body portion with the shaft.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
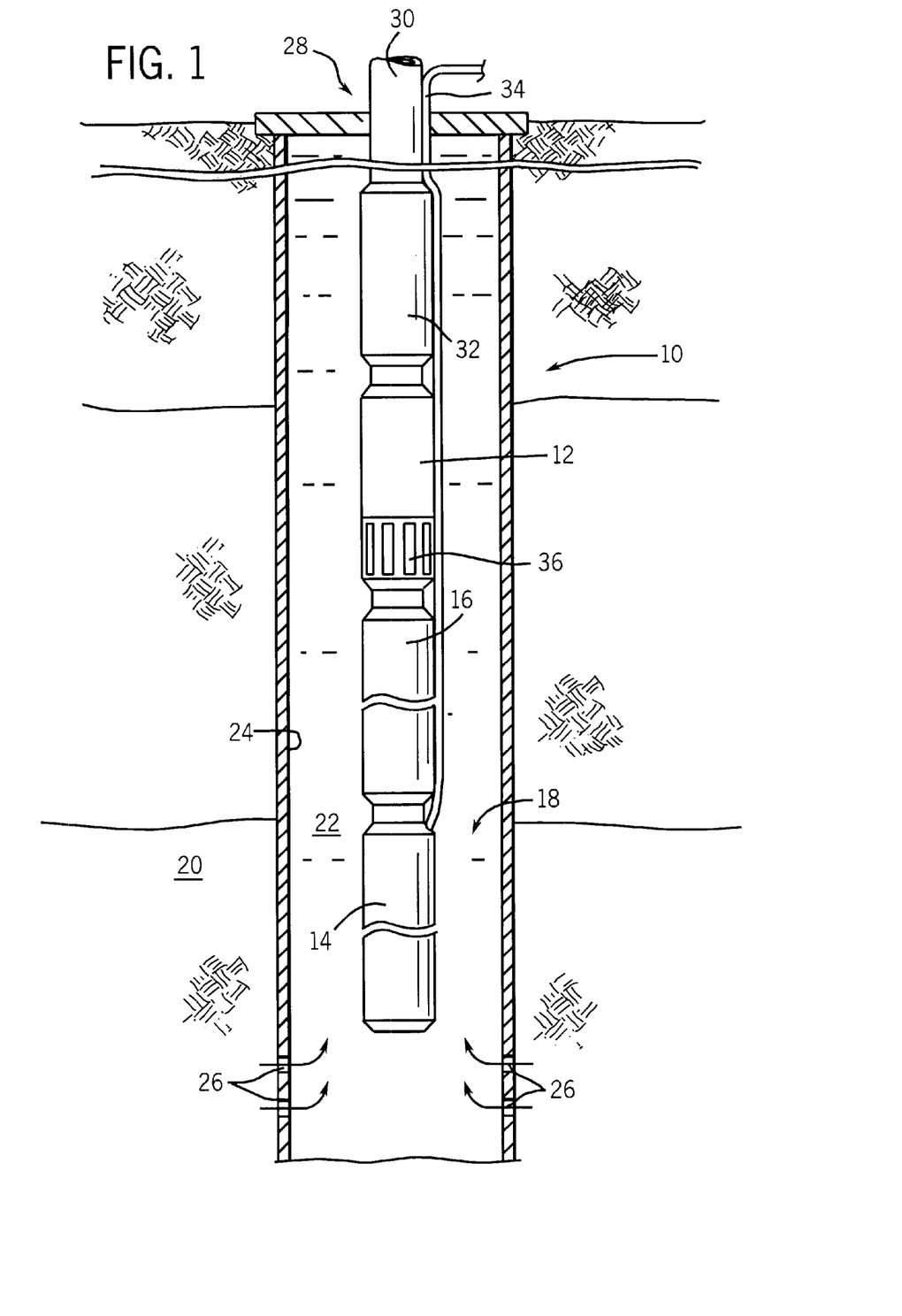
FIG. 1 is a front elevational view of an electric submergible pumping system disposed within a wellbore according to a preferred embodiment of the present invention.

Referring generally to FIG. 1, an exemplary pumping system 10, such as an electric submergible pumping system, is illustrated according to a preferred embodiment of the present invention. Pumping system 10 may comprise a variety of components depending on the particular application or environment in which it is used. Typically, however, pumping system 10 includes at least a submergible pump 12, a submergible motor 14 and a motor protector 16.

In the illustrated example, pumping system 10 is designed for deployment in a well 18 within a geological formation 20 containing desirable production fluids, such as water or petroleum. A wellbore 22 typically is drilled and lined with a wellbore casing 24. Wellbore casing 24 includes a plurality of openings or perforations 26 through which production fluids flow from formation 20 into wellbore 22.

Pumping system 10 is deployed in wellbore 22 by a deployment system 28 that may have a variety of forms and configurations. For example, deployment system 28 may comprise tubing, such as coil tubing or production tubing, connected to pump 12 by a connector 32. Power is provided to submergible motor 14 via a power cable 34. Motor 14, in turn, powers pump 12 which draws production fluid in through a pump intake 36, and pumps the production fluid to the surface via tubing 30.

It should be noted that the illustrated submergible pumping system 10 is merely an exemplary embodiment. Other components can be added to this system and other deployment systems may be implemented. Additionally, the production fluids may be pumped to the surface through tubing 30 or through the annulus formed between deployment system 28 and wellbore casing 24. In any of these configurations of submergible pumping system 10, it is desirable to attain the improved wear characteristics associated with the motor bearing system described below.

Figure 2:
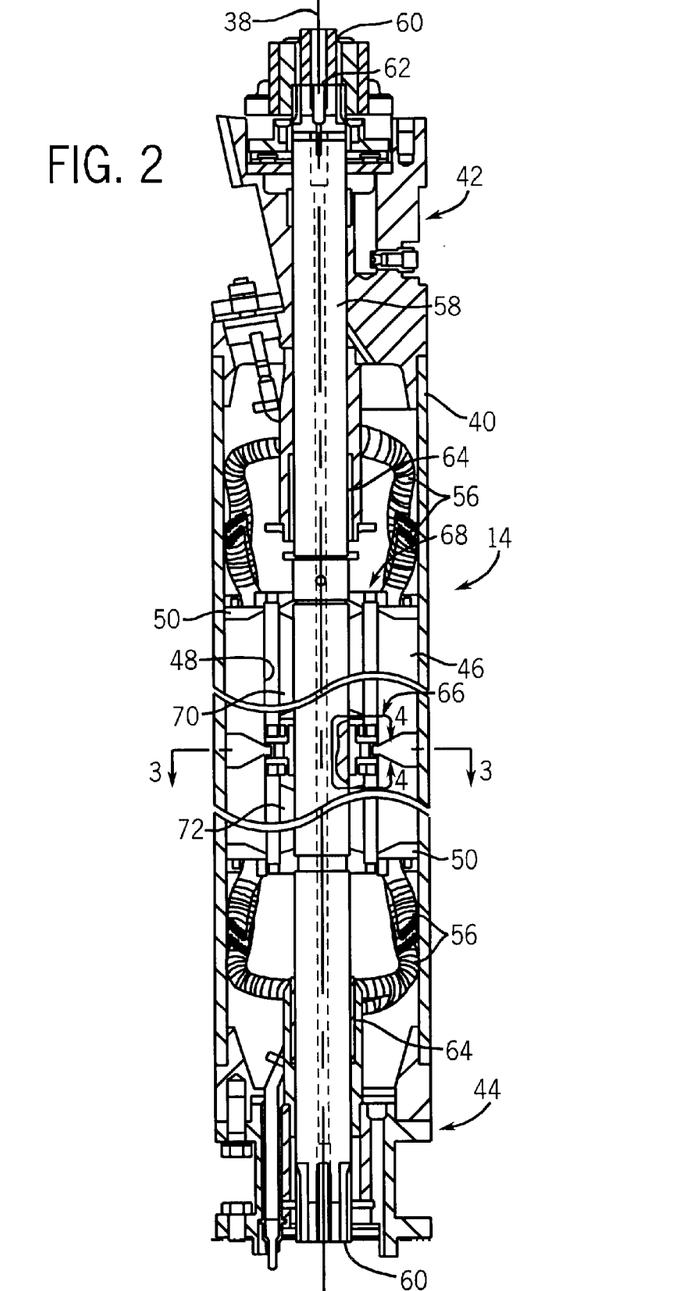
FIG. 2 is a cross-sectional view taken generally along the axis of the submergible electric motor illustrated in FIG. 1 and showing a bearing system, according to a preferred embodiment of the present invention.

Referring generally to FIG. 2, submergible motor 14 is illustrated in cross-section taken generally along a longitudinal axis 38. As illustrated, submergible electric motor 14 includes an outer housing 40 that extends between a motor head 42 and a motor base 44. Head 42 and base 44 may be of conventional design, as known to those of ordinary skill in the art. Typically, head 42 is designed for attachment to another submergible component, such as motor protector 16. Similarly, base 44 is adapted for connection to another submergible component. If, however, submergible motor 14 is the lowermost component, base 44 may be capped by a conventional end cover (not shown).

Figure 3:
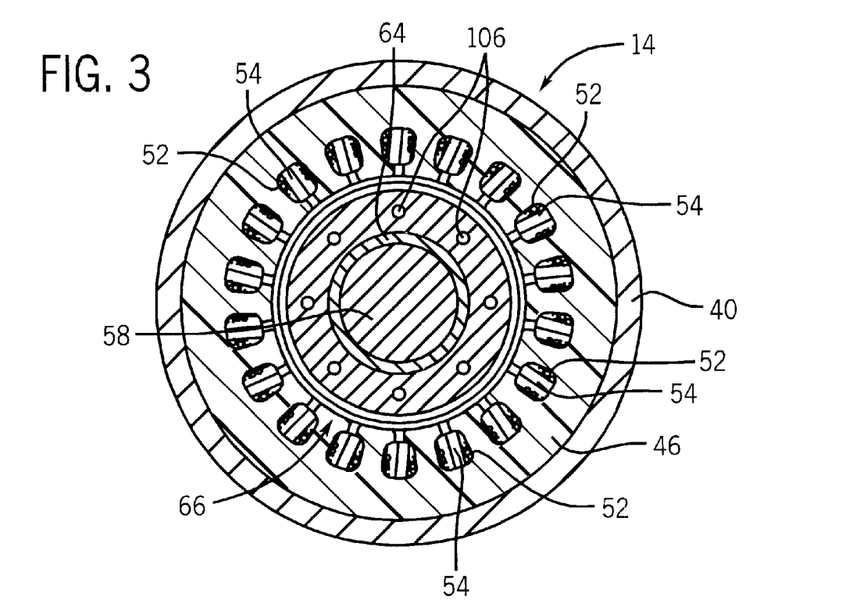
FIG. 3 is a cross-sectional view taken generally along line 3—3 of FIG. 2.

A stator 46 is mounted within outer housing 40 and includes an axial opening or bore 48. Stator 46 is formed from a plurality of laminations 50, such as steel laminations (see also FIG. 4). The laminations 50 include axial openings or winding slots 52 to accommodate conductors 54, as best illustrated in FIG. 3. Conductors 54 also are formed into end coils 56 that are disposed within outer housing 40.

A shaft 58 is rotatably mounted within outer housing 40 and extends through axial opening 48 of stator 46. A typical shaft 58 accepts a coupling at each end 60 to engage the shaft section of a next adjacent submergible component. Additionally, shaft 58 preferably includes an axial opening 62 for conducting lubricant, e.g. oil, therethrough. Shaft 58 may be supported proximate head 42 and base 44 by bearings 64. Bearings 64 may be of conventional design, as known to those of ordinary skill in the art.

Additionally, shaft 58 is supported by a rotor bearing system 66. Rotor bearing system 66 is disposed between shaft 58 and stator 46 to provide support for shaft 58 without damaging stator 46. Multiple rotors 68 are mounted to shaft 58 within axial opening 48 of stator 46. In the illustrated design, an upper rotor 70 is disposed above rotor bearing system 66, and a lower rotor 72 is disposed beneath rotor bearing system 66.

Figure 4:
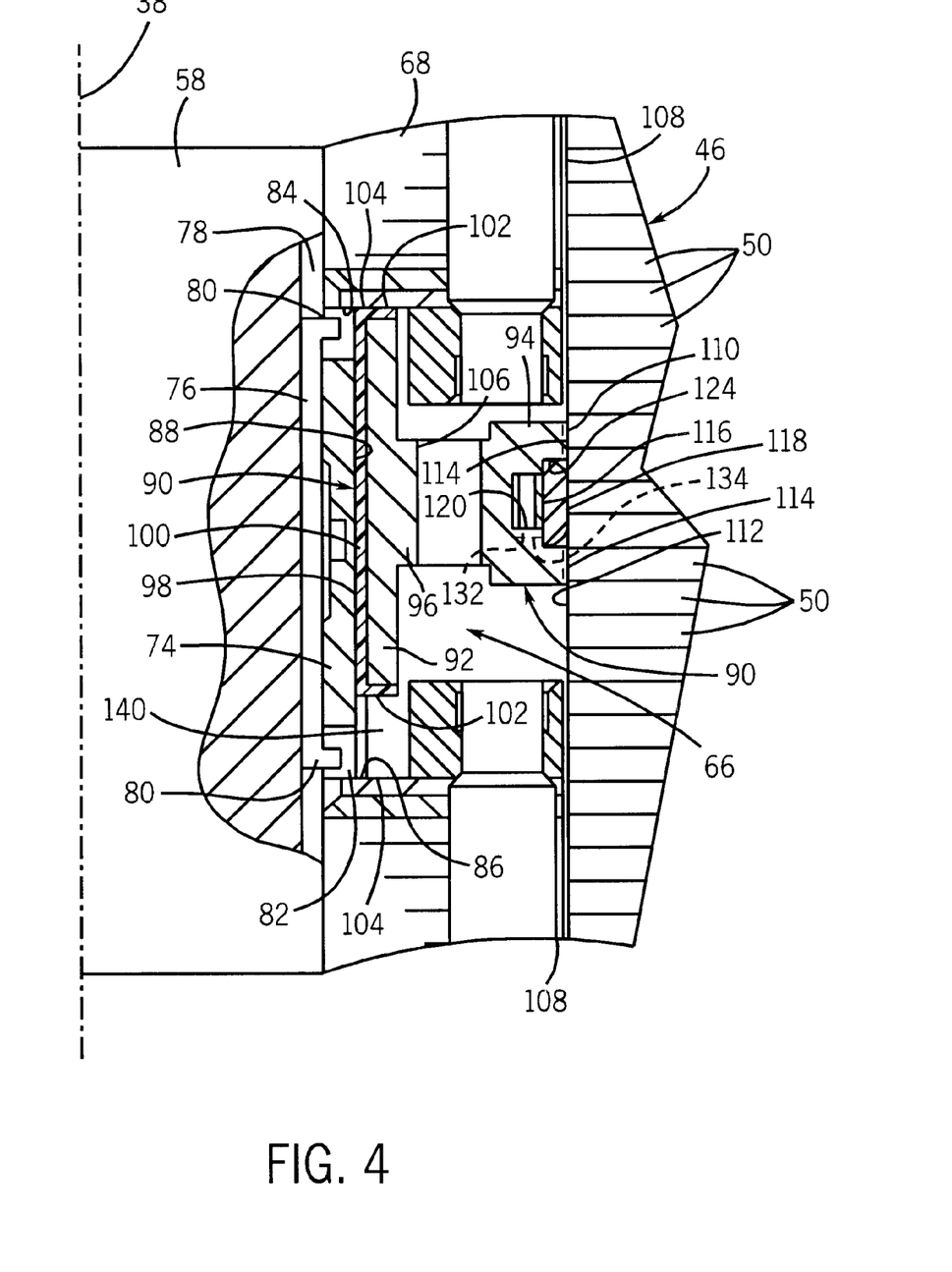
FIG. 4 is an enlarged view of a portion of the cross-section of the bearing system illustrated in FIG. 2.

Referring generally to FIG. 4, an enlarged view of region 4—4 of FIG. 2 is illustrated. Specifically, a cross-sectional view of one side of rotor bearing system 66 is provided to illustrate the details of rotor bearing system 66.

As illustrated, bearing system 66 is disposed around shaft 58 and generally between stator 46 and shaft 58. Bearing system 66 includes a bearing sleeve 74 mounted adjacent shaft 58 such that it encircles shaft 58. Bearing sleeve 74 is prevented from rotational movement with respect to shaft 58 via its connection to a key 76 that is received in a keyway 78 formed in shaft 58. Preferably, key 76 includes a pair of protruding tabs 80 that extend radially outward into notches 82 at the upper and lower ends of sleeve 74. Also, protruding ends 80 are disposed between an upper abutment surface 84 and a lower abutment surface 86. Upper abutment surface 84 is defined by a bottom wall of upper rotor 70, and lower abutment surface 86 is defined by an upper wall of lower rotor 72. Furthermore, bearing sleeve 74 preferably is made from a metal material, such as a hardened steel or bronze, and includes a radially outlying contact surface 88.

Rotor bearing system 66 further includes an annular, main body portion 90 that is disposed in sliding engagement with bearing sleeve 74. Main body portion 90 preferably includes a radially inward region 92, a radially outward region 94 and a central region 96 connecting radially inward region 92 and radially outward region 94. Radially inward region 92 includes a contact surface 98 disposed at a radially inward position for contact with surface 88 of bearing sleeve 74. The sliding engagement permits both axial movement and rotational movement of bearing sleeve 74 with respect to main body portion 90. For example, as shaft 58 rotates, bearing sleeve surface 88 slides along contact surface 98 of main body portion 90.

Preferably, contact surface 98 is a polymeric surface, such as a polyetheretherketone (PEEK) surface, formed by a layer of polymeric material 100, e.g. PEEK material. Radially inward region 92 also includes a pair of axially opposed abutment ends 102 formed at the top and the bottom of radially inward region 92. Preferably each abutment end 102 presents a polymeric abutment surface 104 provided by extending layer 100 along the upper and lower abutment ends 102, as illustrated best in FIG. 4.

Abutment surfaces 104 are disposed to abut or engage surfaces 84 and 86 of rotors 70 and 72, respectively, to achieve axial movement of main body portion 90. The use of a polymeric material, such as PEEK material at abutment ends 102, eliminates the need for conventional thrust washers.

Preferably, central portion 96 also includes a plurality of axial openings 106 extending therethrough. Axial openings 106 cooperate with annular space 108 formed between stator bore 48 and rotor 68 to permit the flow of internal motor fluids, e.g. lubricating oil, therethrough.

The radially outward region 94 of main body portion 90 includes a radially outward surface 110 disposed proximate an interior surface 112 of stator 46. Interior surface 112 defines axial opening 48. Preferably, outer surface 110 is formed on a hardened layer 114, such as a stellite weld overlay, applied to radially outward region 94. Other than polymeric layer 100 and hardened layer 114, main body portion 90 preferably is formed from a non-magnetic material, such as stainless steel, e.g. 316 Stainless Steel, or bronze. Use of these relatively soft metal materials as the primary material component in main body portion 90 promotes economical production relative to the cost of producing conventional hard, non-magnetic (e.g. stellite) bearings.

Additionally, a spring mechanism 116 is engaged with main body portion 90 to provide a biasing force between interior surface 112 of stator 46 and main body portion 90. Spring mechanism 116 should be designed to provide a sufficient biasing force between main body portion 90 and stator 46 to prevent rotation of main body portion 90 during rotation of shaft 58 and operation of the electric submergible pumping system 10. Preferably, a bracelet 118 is disposed about spring mechanism 116 intermediate spring mechanism 116 and interior surface 112 of stator 46. Thus, bracelet 118 is biased against stator 46 by spring mechanism 116 to eliminate rotation of main body portion 90 during operation of submergible motor 14.

Figure 5:
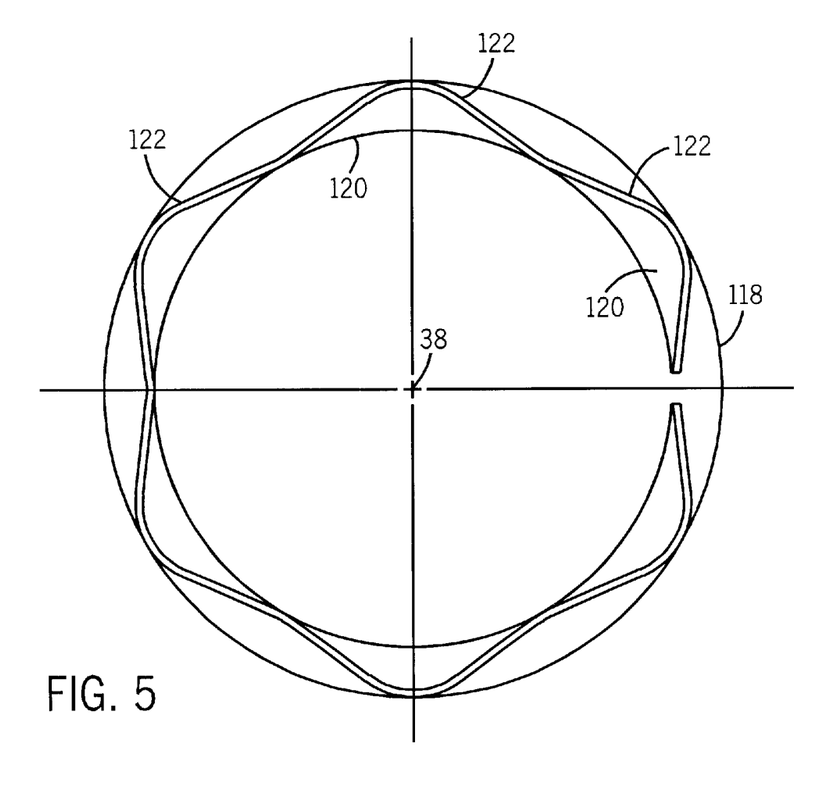
FIG. 5 is a schematic top view of one embodiment of the spring mechanism illustrated in FIGS. 2–4 and utilized in biasing the bracelet outwardly against an interior wall of the stator.

Spring mechanism 116 may be formed in a variety of ways, including the utilization of a plurality of coil springs oriented in a radially outward direction to bias bracelet 118 against stator 46. Preferably, however, spring mechanism 116 is a wave spring, as best illustrated in FIG. 5. When in the form of a wave spring, spring mechanism 116 is received in a groove 120 disposed in radially outward region 94 of main body portion 90. The wave spring (spring mechanism 116) includes a plurality of undulations 122 that are disposed about main body portion 90 when the spring mechanism is retained in groove 120. The radially outlying portions of undulations 122 contact bracelet 118 and bias it towards an expanded configuration in contact with interior surface 112 of stator 46. The wave spring should have sufficient resiliency to create sufficient force between main body portion 90 and stator 46 to prevent rotation of main body portion 90 during operation of motor 14. The wave spring preferably is formed from a non-magnetic material, such as Inconel.

Bracelet 118 also is preferably made from a non-magnetic material, such as Inconel. The exemplary illustrated design of bracelet 118 includes a single band that extends around main body portion 90 and spring mechanism 116, such that bracelet 118 is disposed between spring mechanism 116 and interior surface 112 of stator 46. In the illustrated embodiment, radially outward region 94 includes an expanded groove 124 disposed adjacent to and radially outward of groove 120 to form an overall stepped groove. The groove 124 is sized to receive bracelet 118.

Figures 6, 6A:
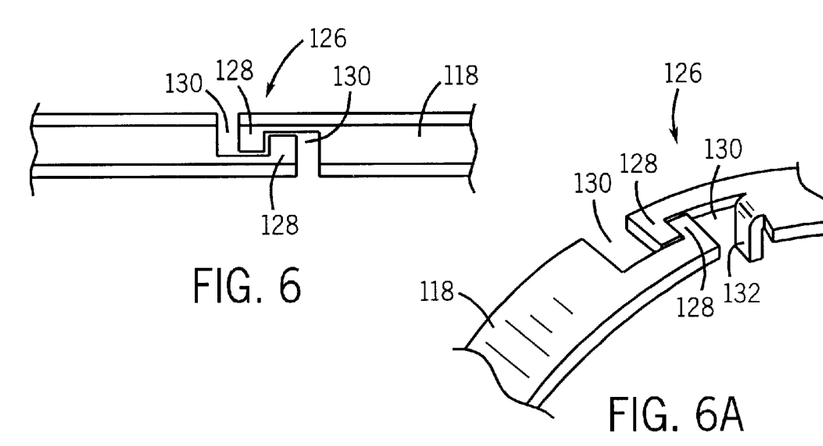
FIG. 6 is an enlarged view of an engagement end of the bracelet illustrated in FIG. 2.
FIG. 6A is a perspective view of a slightly modified version of the bracelet illustrated in FIG. 6.

Bracelet 118 may be formed as a single band having two connection ends 126, as illustrated in FIG. 6. Connection ends 126 include a pair of hooks 128 designed to engage one another in such a manner as to limit expansion of bracelet 118. However, each hook includes an oversized gap area 130 designed to permit limited motion of hooks 128 with respect to one another. This motion allows sufficient diametral compression of bracelet 118 to permit insertion of the bracelet into axial opening 48 of stator 46. Further, the gaps permit sufficient expansion of bracelet 118, under the biasing influence of spring mechanism 116, to provide sufficient force against interior surface 112, as described above.

Rotation of the main body 90 with respect to the bracelet 118 may be prevented by a variety of mechanisms, including a pin or key in the main body located to engage an aperture in the bracelet, or a pair of tabs in the spring mechanism, one engaging an aperture in the bracelet and the other engaging an aperture in the main body. As illustrated by the slightly modified version of bracelet 118 in FIG. 6A, the rotation also may be prevented by a tab 132 located on the bracelet 118 to engage an aperture 134 in the main body 90 (see FIG. 4).

In operation, submergible motor 14 rotates shaft 58 to power submergible pump 12, and the shaft is supported by rotor bearing system 66. As shaft 58 rotates, bearing sleeve 74 rotates therewith and slides against contact surface 98 of main body portion 90. The use of materials, such as hardened steel for bearing sleeve 74 and PEEK for layer 100, reduces wear and provides great longevity for bearing system 66.

As shaft 58 rotates, spring mechanism 116 and bracelet 118 cooperate to apply a sufficient biasing force between stator 46 and main body portion 90 to eliminate rotation of main body portion 90. Furthermore, as shaft 58 increases in temperature during operation, it tends to expand and move rotor 68 and bearing sleeve 74 in an axial direction. Depending on the placement of main body portion 90, abutment surface 84 or 86 may force main body portion 90 to move in an axial direction. However, after this initial heating cycle, there tends to be little, if any, axial movement of main body portion 90. Generally, there is sufficient clearance provided in the space 140 (see FIG. 4) such that main body portion 90 does not move axially during the heating and cooling of submergible motor 14.

Figure 7:
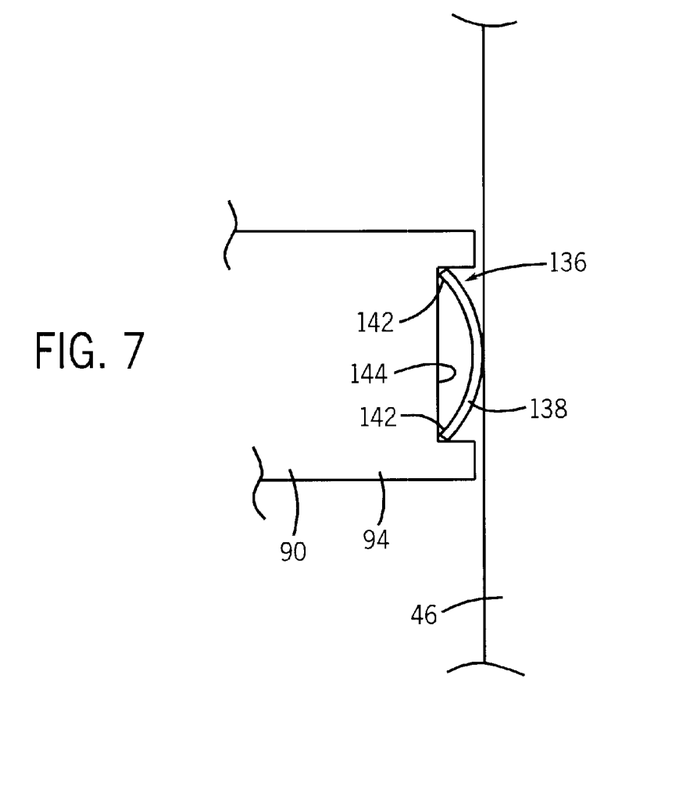
FIG. 7 is an enlarged view of an alternate embodiment of the bearing system illustrated in FIG. 2.

An alternate embodiment of rotor bearing system 66 is illustrated in FIG. 7. In this embodiment, radially outward region 94 of main body portion 90 includes an outer annular groove 136. Outer annular groove 136 is disposed about the perimeter of radially outward region 94. Groove 136 is sized to receive a spring member 138 that preferably extends around the perimeter of main body portion 90.

As illustrated, spring member 138 is disposed intermediate main body portion 90 and stator 46. Although a bracelet may be used as described above, the spring member may also be disposed for contact with stator 46 to bias main body portion 90 in a direction away from stator 46.

Preferably, spring member 138 is generally convex or C-shaped when taken in cross-section, as illustrated in FIG. 7. As shown, spring member 138 may be arranged such that its curved or convex portion is positioned for contact with stator 46 while its opposing terminal edges 142 contact a base surface 144 of outer annular groove 136.

Figure 8:
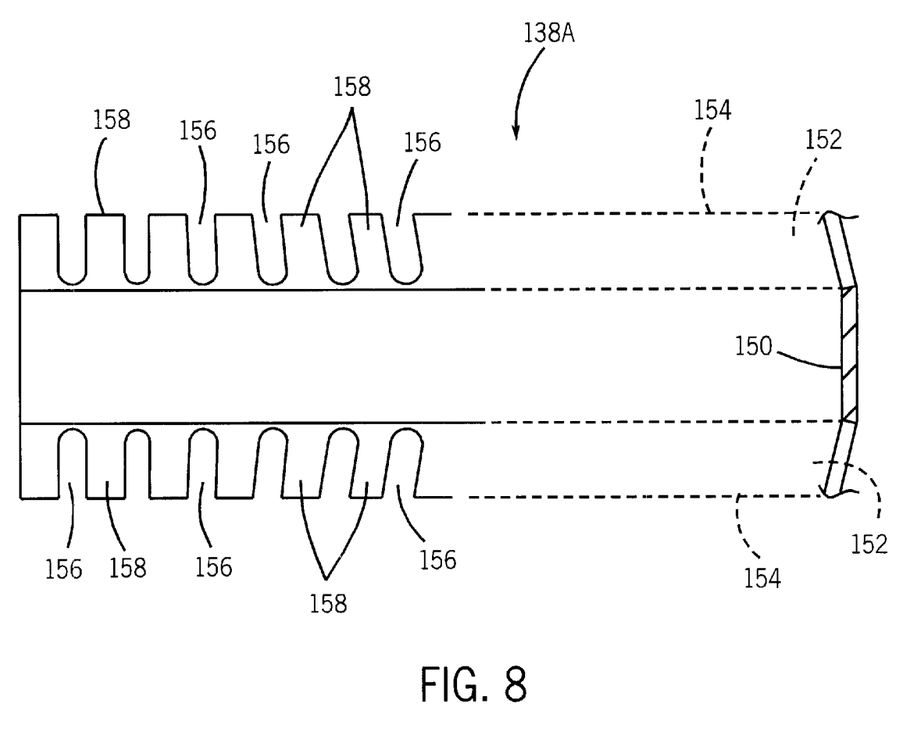
FIG. 8 is a front view of a portion of an alternate spring member for use with the bearing system illustrated in FIG. 7.

Referring to FIG. 8, an alternate embodiment of spring member 138, labeled as spring member 138A, is illustrated. Spring member 138A is disposed in outer annular groove 136 as described with the embodiment illustrated in FIG. 7. However, spring member 138A has a different shape than spring member 138. For example, spring member 138A includes a generally flat center wall 150 disposed for contact with stator 46. A pair of tapered walls 152 taper or curve radially inward from center wall 150 and terminate at a pair of opposed terminal edges 154.

Tapered walls 152 and terminal edges 154 may be interrupted by a plurality of gaps 156 such that walls 152 are formed by a plurality of spring tabs 158. The use of spring tabs 158 separated by gaps 156 potentially provides spring member 138A with greater flexibility. However, the plurality of spring tabs 158 ensure that spring member 138A remains biased towards interior surface 112 of stator 46.

Figure 9:
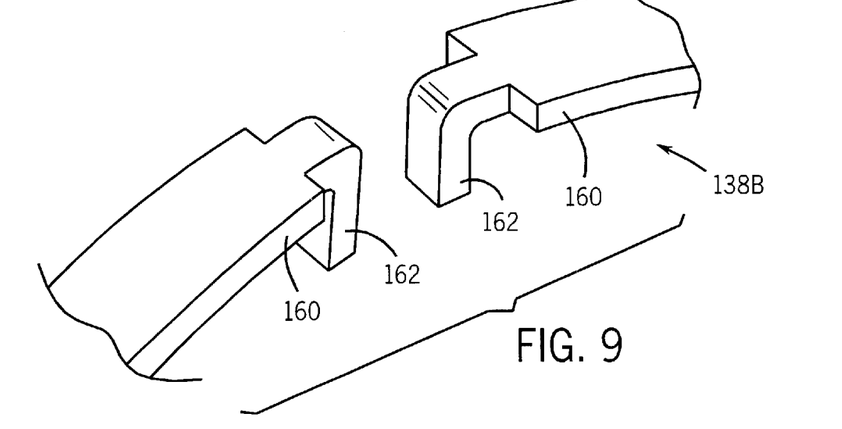
FIG. 9 is a perspective view of a portion of another alternate spring member.

Another embodiment of spring member 138 is illustrated in FIG. 9 and labeled 138B. As in FIG. 8, only a portion of the spring member is illustrated as necessary to show the unique features of the subject embodiment. Spring member 138B is designed to encircle radially outward portion 94 of main body portion 90 within outer annular groove 136. The circumference of spring member 138B is slightly larger than that of the interior surface 112 of stator 46. Thus, spring member 138B (as with spring members 138 and 138A) must be compressed before it is moved into the axial opening 48 defined by interior surface 112 of stator 46. Once within stator 46, spring member 138B maintains a spring bias against interior surface 112.

Spring member 138B preferably terminates at a pair of terminal ends 160 that generally face one another. Each terminal end 160 includes a tab 162 that extends radially inward.

Figure 9A:
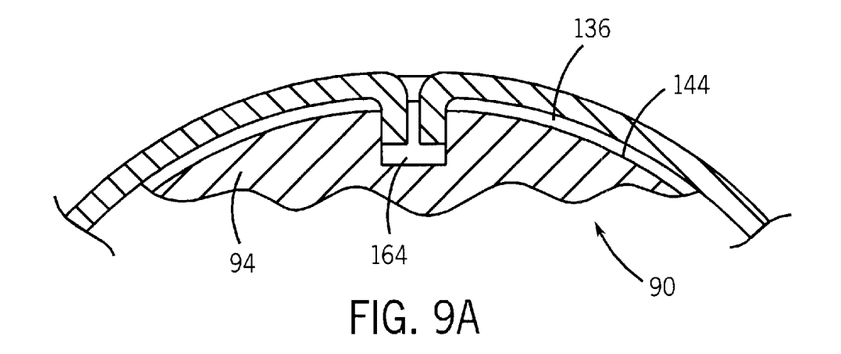
FIG. 9A is an edge view of the spring member of FIG. 9 engaged with a main body portion of the bearing system.
Figure 9B:
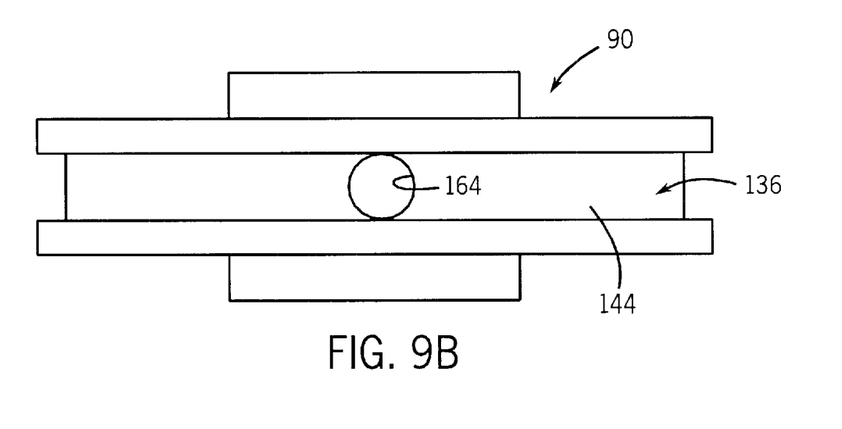
FIG. 9B is a front view of the main body portion illustrated in FIG. 9A.

As better illustrated in FIGS. 9A and 9B, tabs 162 are designed to prevent rotation of spring member 138B with respect to main body portion 90. In the exemplary embodiment, a gap or opening 164 extends radially inward from base surface 144 of outer annular groove 136. Opening 164 is sized to receive inwardly extending tabs 162 to prevent rotation of spring member 138B along outer annular groove 136.

Another advantage of the present bearing system is the ability to utilize the bearing system in rebuilding electric motors. The use of a resilient spring member or spring mechanism in combination with a bracelet 118 permits certain electric motors to be rebuilt where they would otherwise be past their useful life, at least without replacing the stator.

For example, conventional rotor bearings tend to spin during operation of the electric motor. This often wears a shallow groove in interior surface 112 that defines the stator bore. If the motor is rebuilt, the worn stator must be replaced, because the worn groove does not permit adequate support of the rotor bearing, leading to vibration. Additionally, the rotor bearing may tend to become axially locked in the worn groove. Once locked, the bearing system tends to strongly resist axial thermal expansion of the shaft, which can lead to premature bearing and electrical failure.

With the bearing systems described above, this problem is alleviated. Specifically, any groove worn into interior surface 112 of the stator by a conventional rotor bearing can be smoothed, as by sanding with an acceptable abrasive. This sanding action creates a stator bore that is slightly oversized in the area where the distinct groove previously existed. However, because the spring member (or the combined spring and bracelet) can expand, the bearing system remains fully supported, even in the expanded area.

Thus, during rebuilding, the groove is sanded and then the spring and/or bracelet are passed through the normal areas of the bore and allowed to expand into the oversized area. The bearing system remains adequately supported without providing detrimental resistance to axial thermal expansion.

It will be understood that the foregoing description is of preferred exemplary embodiments of this invention, and that the invention is not limited to the specific forms shown. For example, the main body portion may comprise non-magnetic austenitic stainless steel or bronze; the polymeric bearing surface material may be applied by a variety of processes including high velocity oxy fuel techniques, and it may comprise polymeric materials other than PEEK. Also, the polymeric bearing surface may be a separate component inserted inside the main body; a non-polymeric bearing material may be used, such as metals, ceramics, carbides; and the polymeric or other bearing surface may be applied to or embodied in the sleeve. Furthermore, the stator laminations may be formed of bronze rather than steel, and the bearing may comprise carbon steel; the stellite weld overlay may be replace with other materials or techniques including a layer formed by: electroless nickel plating, HVOF tungsten carbide, titanium nitride, boron flame spray, soldered or shrink-fit hard ring etc.; the configuration of the various components can also be changed according to the specific application; the spring bias force exerted against the bracelet can be adjusted according to the size and application of the motor; and a variety of electric motor types may benefit from the rotor bearing system described above. These and other modifications may be made in the design and arrangement of the elements without departing from the scope of the invention as expressed in the appended claims.

What is claimed is:

1. An electric motor, comprising:
   a housing;
   a stator mounted within the housing;
   a shaft rotatably mounted within the housing; and
   a rotor bearing disposed between the stator and the shaft, the rotor bearing comprising a bearing sleeve mounted adjacent the shaft; a main body portion; and a spring disposed intermediate the main body portion and the stator, wherein the spring comprises a joint mechanism configured to removably couple opposite ends of the spring around the shaft.

2. The electric motor as recited in claim 1, wherein the spring is disposed in contact with the stator.

3. The electric motor as recited in claim 1, comprising an expandable band extending around the shaft between the spring and the stator.

4. The electric motor as recited in claim 1, wherein the spring includes a retainer designed to engage the main body portion to prevent rotation of the spring relative to the main body portion.

5. The electric motor as recited in claim 1, wherein the ring-shaped axial cross-section comprises a corrugated geometry.

6. An electric motor, comprising:
   a housing;
   a stator mounted within the housing;
   a shaft rotatably mounted within the housing; and
   a rotor bearing disposed between the stator and the shaft, the rotor bearing comprising a bearing sleeve mounted adjacent the shaft and a main body portion, the main body portion including an annular groove; and a spring disposed in the annular groove intermediate the main body portion and the stator to apply a force against the main body portion, wherein the spring comprises a ring-shaped axial cross-section and a nonlinear radial cross-section and the ring-shaped axial cross-section comprises a radial joint mechanism configured to removably couple opposite ends of the spring.

7. An electric motor, comprising:
   a housing;
   a stator mounted within the housing;
   a shaft rotatably mounted within the housing; and
   a rotor bearing disposed between the stator and the shaft, the rotor bearing comprising a bearing sleeve mounted adjacent the shaft; a main body portion disposed in sliding engagement with the bearing sleeve; a spring engaged with the main body portion and being configured to provide a biasing force against the stator, wherein the spring comprises a ring-shaped axial cross-section having a radial joint mechanism configured to removably couple opposite ends of the spring.

8. The electric motor as recited in claim 7, wherein the spring is disposed in contact with the stator.

9. The electric motor as recited in claim 7, wherein the spring comprises a convex radial cross section.

10. The electric motor as recited in claim 7, wherein the spring includes a retainer designed to engage the main body portion to prevent rotation of the spring relative to the main body portion.

11. The electric motor as recited in claim 7, wherein the ring-shaped axial cross-section comprises a plurality of undulations.

* * * * *